US012539519B2

(12) United States Patent
Gaume et al.

(10) Patent No.: US 12,539,519 B2
(45) Date of Patent: Feb. 3, 2026

(54) POWDER MILLING

(71) Applicant: University of Central Florida Research Foundation, Inc., Orlando, FL (US)

(72) Inventors: Romain Gaume, Lake Mary, FL (US); Matthew Julian, Merritt Island, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 403 days.

(21) Appl. No.: 18/122,833

(22) Filed: Mar. 17, 2023

(65) Prior Publication Data

US 2023/0294103 A1 Sep. 21, 2023

Related U.S. Application Data

(60) Provisional application No. 63/320,793, filed on Mar. 17, 2022.

(51) Int. Cl.
*B02C 17/20* (2006.01)
*B02C 17/18* (2006.01)

(52) U.S. Cl.
CPC .......... *B02C 17/1805* (2013.01); *B02C 17/20* (2013.01)

(58) Field of Classification Search
CPC ............................ B02C 17/1805; B02C 17/20
See application file for complete search history.

(56) References Cited

U.S. PATENT DOCUMENTS

| | | | | |
|---|---|---|---|---|
| 5,957,398 | A * | 9/1999 | Ogata | B02C 17/163 241/179 |
| 2009/0120010 | A1 * | 5/2009 | Nonnet | C04B 35/636 51/307 |
| 2015/0086416 | A1 * | 3/2015 | Anderson | B02C 17/186 420/528 |
| 2015/0183888 | A1 * | 7/2015 | Osterby | C08B 15/00 536/56 |
| 2016/0185667 | A1 * | 6/2016 | Shikolsky | C04B 35/111 501/153 |
| 2022/0088608 | A1 * | 3/2022 | Teng | B02C 17/1815 |
| 2024/0361786 | A1 * | 10/2024 | Dean | B02C 17/186 |

* cited by examiner

*Primary Examiner* — David J Bolduc
(74) *Attorney, Agent, or Firm* — Troutman Pepper Locke LLP; Nicholas J. DiCeglie, Jr.; Gabrielle L. Gelozin

(57) ABSTRACT

A method can include milling a powder with a test grinding media, and determining an amount of abraded grinding media that abrades from the test grinding media into the powder due to the milling of the powder. The method can include creating a compensated powder to account for the amount of the abraded grinding media such that the powder milling process results in a desired powder composition.

18 Claims, 7 Drawing Sheets

POWDER MILLING

CROSS-REFERENCE TO RELATED APPLICATIONS

This application claims priority to and the benefit of U.S. Provisional Application No. 63/320,793, filed Mar. 17, 2022, the entire contents of which are herein incorporated by reference in their entirety.

STATEMENT OF GOVERNMENT RIGHTS

This invention was made with government support under contract no. 20CWDARI00038-01-00 awarded by the Department of Homeland Security. The government has certain rights in the invention.

FIELD

This disclosure relates to powder milling, e.g., for the fabrication of materials from the powder.

BACKGROUND

The fabrication route of many materials, particularly glass and ceramics, can utilized a process by which the mixing of precursor powders is followed by a milling process with a grinding media (e.g., a ball milling process) to ensure deagglomeration, intimate mixing, and/or the attainment of a satisfactory particle size. In such milling processes, a grinding medium, e.g., one or more hard balls, is placed inside a jar, along with the powders, and is turned at high speeds such that the larger mass and momentum of the medium is utilized to pulverize the agglomerated powder into smaller particles. However, due to the abrasiveness of the powder, the grinding medium slowly wears and introduces impurities into the powder mixture that can be deleterious to the performance of the material through either the presence of the impurity or by causing a deviation from the stoichiometric ratio of elements required to obtain a pure phase product.

Ideally, the milling process is optimized to achieve satisfactory deagglomeration and mixing while limiting contamination (also known as deposit) to a negligible amount. The optimization of this process is time consuming and requires running many experiments to determine the best combination of the many interdependent variables involved. These variables include the mass of powders, the solid loading fraction of the slurry, the surface area of milling medium, dimensions of the jar, the duration of milling, the speed of rotation and the ball-to-powder loading fraction. Traditional methods to quantify any contaminate deposit have been inaccurate and time consuming.

Such conventional methods and systems have generally been considered satisfactory for their intended purpose. However, there is still a need in the art for improved powder milling processes and devices. The present disclosure provides a solution for this need.

SUMMARY

A method can include milling a powder with a test grinding media, and determining an amount of abraded grinding media that abrades from the test grinding media into the powder due to the milling of the powder. The method can include creating a compensated powder to account for the amount of the abraded grinding media such that the powder milling process results in a desired powder composition.

In certain embodiments, the method can include milling the compensated powder with a similar grinding media to the test grinding media to result in the desired powder composition including the abraded grinding media. In certain embodiments, for example, the test grinding media and the similar grinding media can include the same or functionally similar bulk composition.

In certain embodiments, determining the amount of the abraded grinding media can include detecting an amount of a detectable tracer material integrated within a bulk material of the test grinding media, and correlating the amount of tracer material to the amount of the abraded grinding media. Correlating the amount of the abraded grinding media can include correlating the amount of tracer material to a thickness of the test grinding media. Correlating the amount of tracer material to a thickness can include using a diffusion profile.

The method can further include creating the test grinding media to include the detectable tracer material. Creating the test grinding media can include diffusing the detectable tracer material into a bulk material of the test grinding media.

In certain embodiments, a bulk material of the similar grinding media can be made only of one or more constituent materials of the desired powder composition. In certain embodiments, the bulk material of the similar grinding media can be the same as the bulk material of the test grinding media. In certain embodiments, the similar grinding media does not include a tracer material, however.

The test grinding media and/or the similar grinding media can include one or more grinding balls. Any other suitable shape is contemplated herein.

The method can include fabricating a structure using the desired powder composition. Fabricating a structure can include fabricating an optical component.

In accordance with at least one aspect of this disclosure, a method can include forming one or more test grinding media to include a bulk material, and a detectable tracer material integrated with the bulk material and configured to allow for correlation between an amount of a tracer material that is in a milled powder to an abraded amount of grinding media from the grinding media. The method can further include diffusing the tracer material into a bulk material to form a diffusion profile that is a function of depth. The method can further include providing diffusion profile information to a user to correlate the amount of the tracer material to the amount of abraded grinding media.

In certain embodiments, the method can include forming the grinding media to have a constant amount of tracer material integrated within the bulk material. For example, the detectable tracer material can be integrated into the bulk grinding media during fabrication of the bulk grinding media. Any other suitable method to integrate the detectable tracer material into the bulk material is contemplated herein.

In accordance with at least one aspect of this disclosure, a test grinding media can include a bulk material, and a detectable tracer material integrated with the bulk material and configured to allow for correlation between an amount of a tracer material that is in a milled powder to an abraded amount of grinding media from the grinding media. The test grinding media can be formed as one or more balls.

In certain embodiments, the tracer material is not radioactive. In certain embodiments, the bulk material is alumina. Any suitable tracer material and bulk material is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
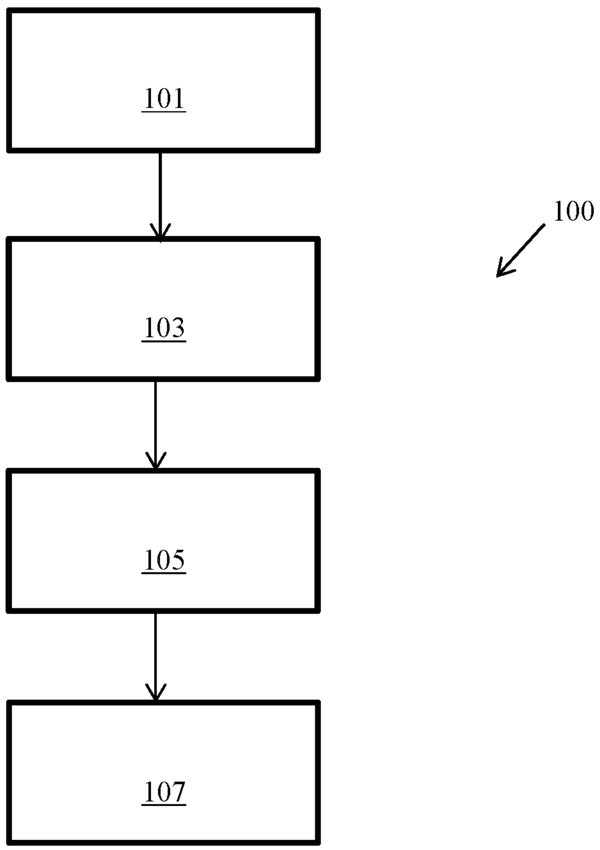
FIG. 1 is a flow diagram of an embodiment of a method in accordance.
Figure 2:
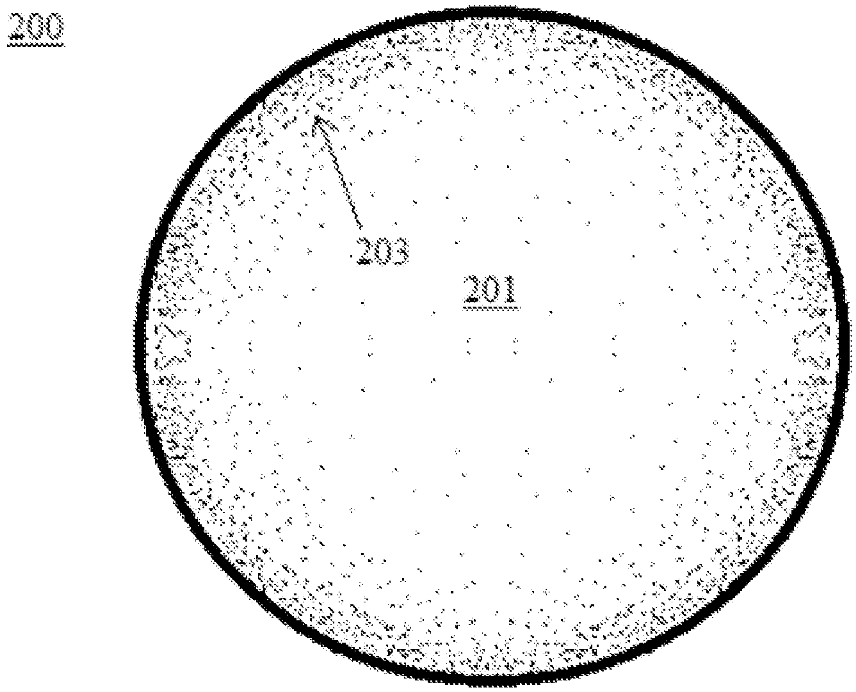
FIG. 2 is a cross-sectional schematic of an embodiment of a test grinding media in accordance with this disclosure, e.g., shown having a gradient of detectable tracer material as a function of depth.
Figure 3:
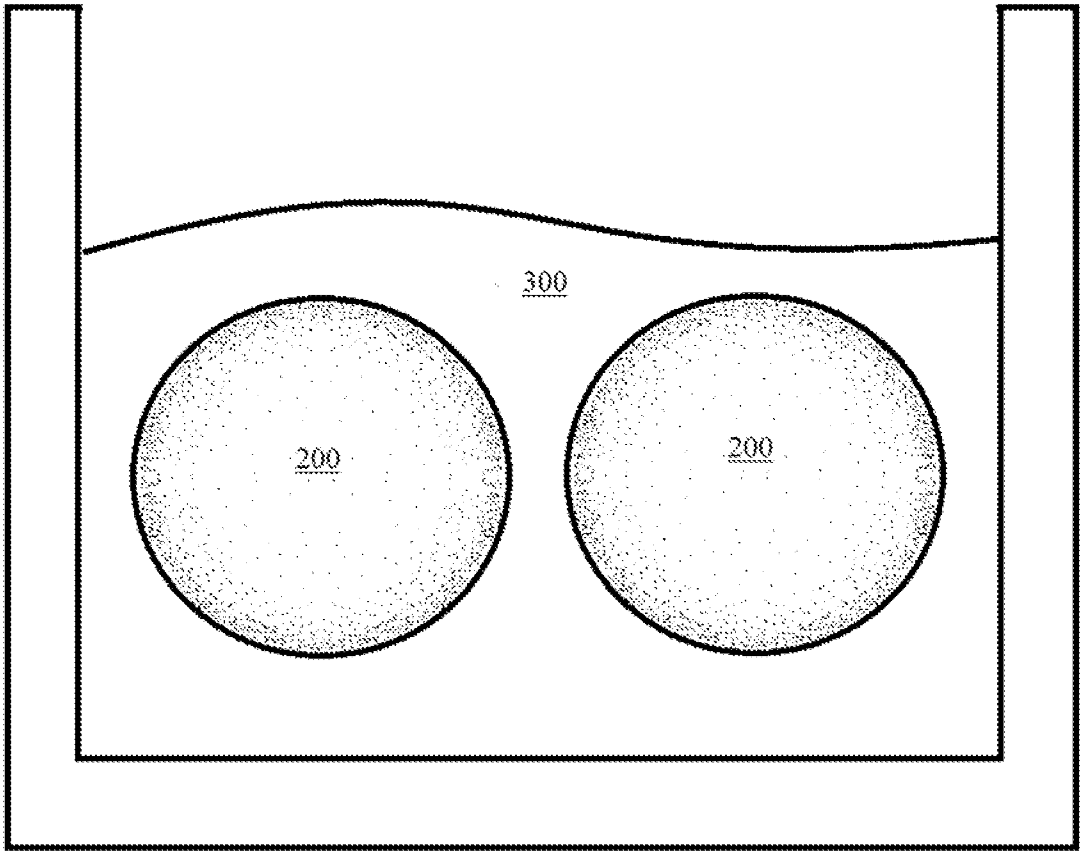
FIG. 3 illustrates a portion of an embodiment of a powder milling process in accordance with this disclosure using the test grinding media of FIG. 2, showing the test grinding media placed in a powder to be milled.
Figure 4:
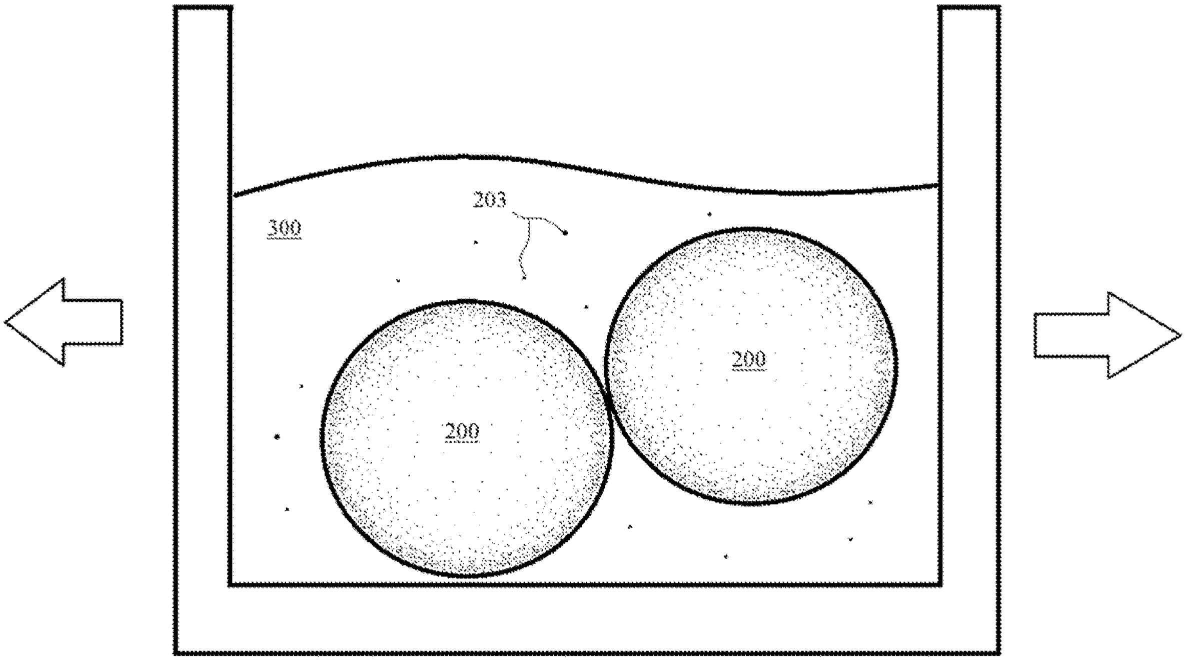
FIG. 4 illustrates a portion of an embodiment of a powder milling process in accordance with this disclosure using the test grinding media of FIG. 2, showing the milling process with abrasion to the test grinding media occurring.
Figure 5:
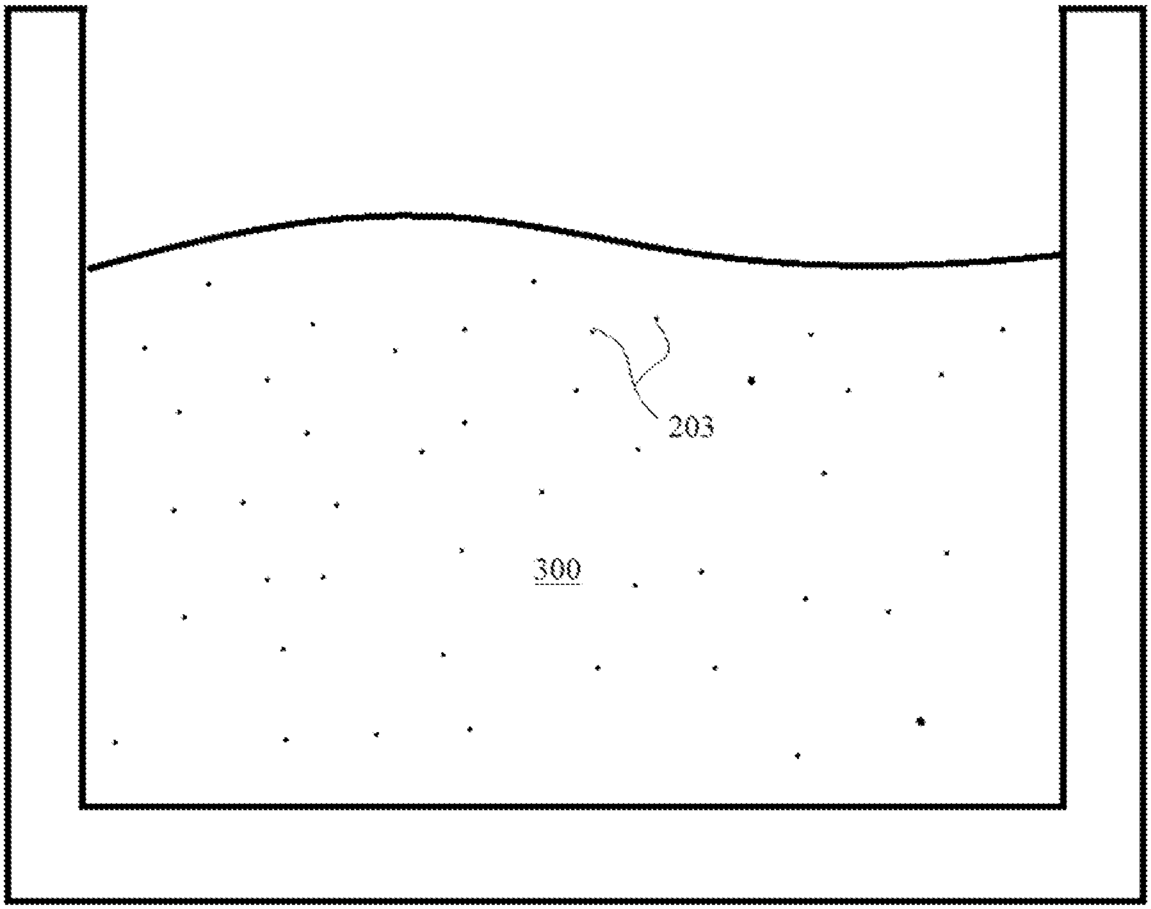
FIG. 5 illustrates a portion of an embodiment of a powder milling process in accordance with this disclosure using the test grinding media of FIG. 2, showing a resultant powder having detectable tracer material interspersed in the milled powder.
Figure 6:
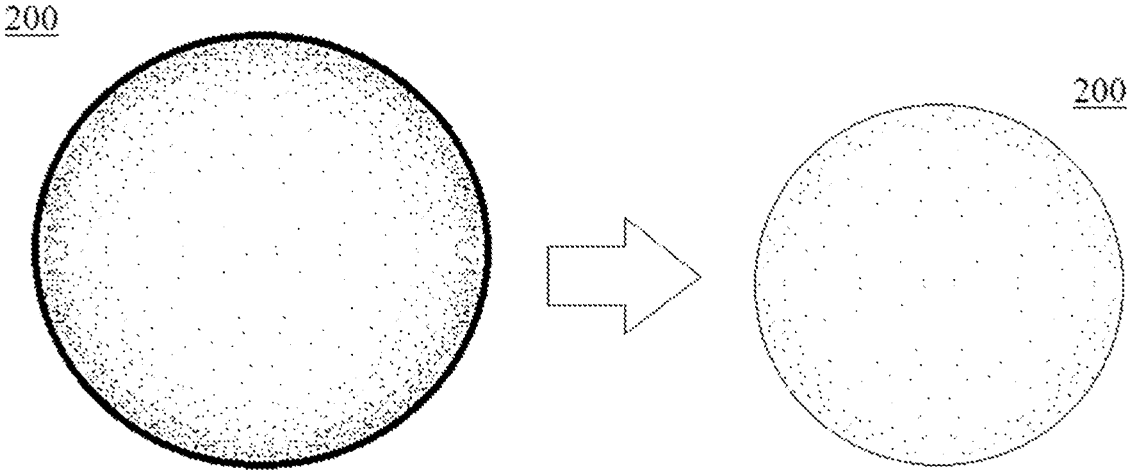
FIG. 6 shows a schematic before and after of the grinding media.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2-8.

Referring to FIGS. 1-7, a method 100 can include milling (e.g., at block 101) a powder 300 with a test grinding media 200, and determining (e.g., at block 103) an amount of abraded grinding media that abrades from the test grinding media 200 into the powder due 300 to the milling of the powder 300. The method 100 can include creating (e.g., at block 105) a compensated powder to account for the amount of the abraded grinding media such that the powder milling process results in a desired powder composition.

In certain embodiments, the method 100 can include milling the compensated powder with a similar grinding media to the test grinding media 200 to result in the desired powder composition including the abraded grinding media. In certain embodiments, for example, the test grinding media 200 and the similar grinding media can include the same or functionally similar bulk composition.

Figure 7:
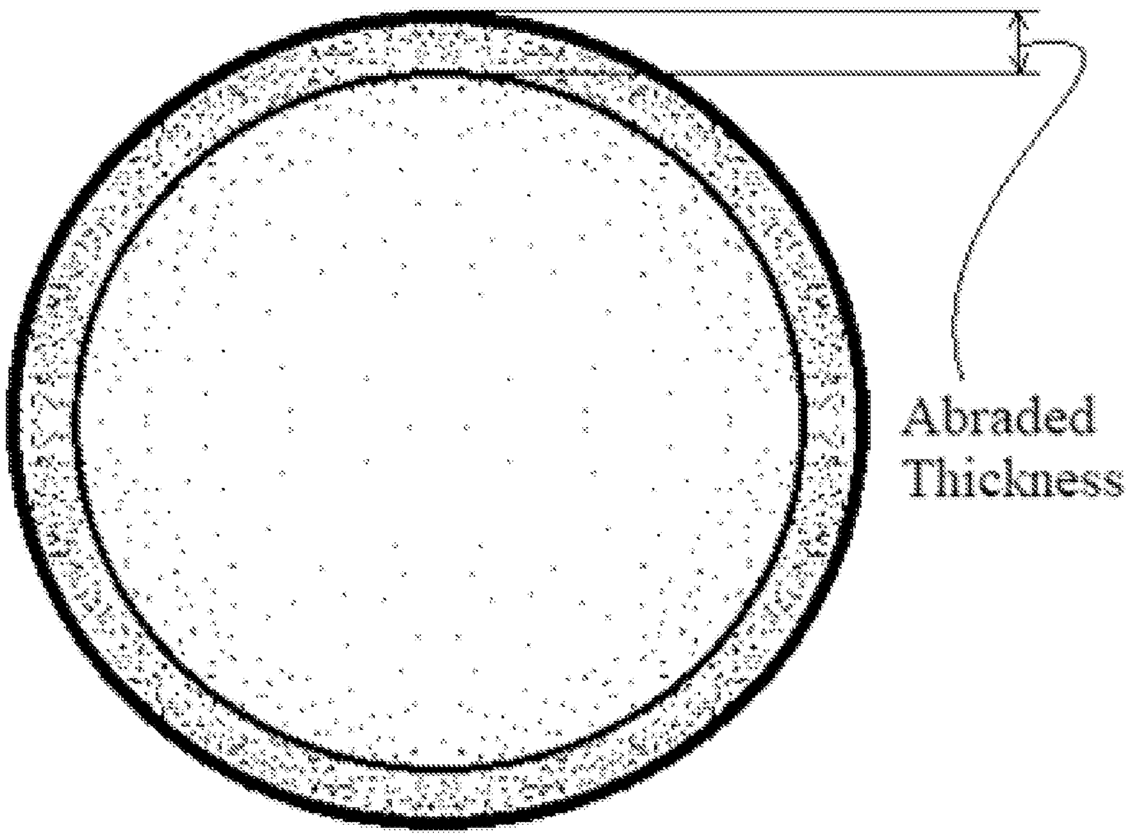
FIG. 7 shows an overlapping schematic before and after of the grinding media illustrating an abraded thickness of the test grinding media.

In certain embodiments, determining the amount of the abraded grinding media can include detecting an amount of a detectable tracer material 203 integrated within a bulk material 201 of the test grinding media 200, and correlating the amount tracer material 203 to the amount of the abraded grinding media (e.g., the amount of bulk material 201 that has been added to the powder 300). Correlating the amount of the abraded grinding media can include correlating the amount of tracer material 203 to a thickness of the test grinding media 200. Correlating the amount of tracer material 203 to a thickness can include using a diffusion profile (e.g., gradient information). For example, the gradient of the tracer material 203 can be known based on previous testing (e.g., variable or constant as a function of depth), and an amount of tracer material 203 can be directly correlated to a thickness of abraded material (e.g., as shown in FIG. 7) from the test grinding media 200. This same thickness can be assumed to be abraded from a similar grinding media in similar milling conditions, e.g., assuming the mechanical properties of the test grinding media is similar to that of the similar grinding media (e.g., hardness and/or wear resistance).

The method 100 can further include creating the test grinding media 200 to include the detectable tracer material. Creating the test grinding media 200 can include diffusing the detectable tracer material into a bulk material 201 of the test grinding media 200.

In certain embodiments, a bulk material of the test grinding media 200 and/or similar grinding media can be made only of one or more constituent materials of the desired powder composition. In certain embodiments, the bulk material of the similar grinding media can be the same as the bulk material 201 of the test grinding media 200. In certain embodiments, the similar grinding media does not include a tracer material 203, however.

The test grinding media 200 and/or the similar grinding media can include one or more grinding balls, e.g., as shown. Any other suitable shape is contemplated herein.

The method 100 can include fabricating a structure using the desired powder composition. Fabricating a structure can include fabricating an optical component, for example.

In accordance with at least one aspect of this disclosure, a method can include forming one or more test grinding media to include a bulk material, and a detectable tracer material integrated with the bulk material and configured to allow for correlation between an amount of a tracer material that is in a milled powder to an abraded amount of grinding media from the grinding media. The method can further include diffusing the tracer material into a bulk material to form a diffusion profile that is a function of depth. The method can further include providing diffusion profile information to a user to correlate the amount of the tracer material to the amount of abraded grinding media.

In certain embodiments, the method can include forming the grinding media to have a constant amount of tracer material integrated within the bulk material. For example, the detectable tracer material can be integrated into the bulk grinding media during fabrication of the bulk grinding media. Any other suitable method to integrate the detectable tracer material into the bulk material is contemplated herein.

In accordance with at least one aspect of this disclosure, a test grinding media can include a bulk material, and a detectable tracer material integrated with the bulk material and configured to allow for correlation between an amount of a tracer material that is in a milled powder to an abraded amount of grinding media from the grinding media. The test grinding media can be formed as one or more balls.

In certain embodiments, the tracer material is not radioactive. In certain embodiments, the bulk material is alumina. Any suitable tracer material and bulk material is contemplated herein.

In optics, grinding media, e.g., spherical balls, can be made of alumina for the type of powders used to make optical components. The grinding media used, however, can be determined by the chemistry/material properties of the powder to be milled. Any suitable material for a certain type of powder to be milled can be used.

Embodiments can include balls doped with a tracer material that is detectable even at very at low amounts with known methods. One having ordinary skill in the art knows what types of tracer materials can be used for certain applications without undue experimentation. One having ordinary skill in the art also knows how to detect and quantify an amount of such tracer materials in resultant powders without undue experimentation.

Certain embodiments of a method can include a doping process for doping one or more grinding media balls with the tracer material. The doping process can be a vapor or other suitable process. The temperature and time of the doping process can be dependent upon the chemistry and material properties of the bulk material.

In certain embodiments, after grinding, it can be determined how much tracer material is in the resultant powder. It can then be determined how much of the ball depth was abraded off based on the diffusion profile (which relates depth to amount of tracer material in the resultant powder). The diffusion profile can be linear if the whole ball is manufactured from start with tracer material, or non-linear if doped after the formation of the ball.

With knowledge of the depth abraded, the amount of total material added to the powder can be determined. Then it can be determined what the actual composition of the final powder is. With this information, the user can revise the input powder to have a compensated composition to make up for the added bulk material. A similar grinding media (e.g., a same dimensioned ball with the same bulk material but without tracer material) can then be used and the final powder can result in the desired composition after milling.

Embodiments can provide quantification of the abrasive wear of a grinding medium during mechanical milling of ceramic precursor powders, for example. In powder milling, even if satisfactory attrition and mixing is achieved, the amount of deposit should be quantitatively measured or verified to be negligible. If the grinding medium is made of a material that enters the chemistry of the material being processed (e.g. alumina grinding medium to blend an aluminum oxide-containing mix of powders), the measured amount of deposit can then be considered prior to mixing of another batch to ensure stoichiometry is achieved once milling is complete.

The fabrication of transparent ceramics is particularly sensitive to this problem and requires careful protocol optimization to either avoid contamination from the milling medium or achieve exact stoichiometry after milling in order to prevent the formation of secondary phases that will act as light scattering centers or optically active species that will interfere with the spectroscopic properties of the ceramic. In the case of YAG transparent ceramics, high purity and high density Al2O3 grinding medium is commonly used. However, over the course of several hours of milling, a small amount of alumina leaches from the medium to the powder and slowly shifts from the nominal stoichiometry, yielding sub optimal optical quality at the conclusion of the ceramic processing. This small Al2O3 deposit is extremely hard to measure in a mixture that already contains a large amount on Al2O3, in a relative sense.

Traditionally, there has been no suitable procedure for accurately quantifying the amount of contamination from grinding media during the milling process. In the past, time-consuming trial and error methods have been used to roughly quantify this deposit, by milling and processing several powder batches with varied initial stoichiometry then determining the powder composition yielding the best optical quality. Another method includes determining the amount of deposit by running the mill with only the grinding medium and a solvent present in the jar. After a set milling time the balls and jar are rinsed into a catch and the solvent is evaporated. Weighting the solid remaining gives the mass removed from the balls during that run time. The problem with this method is that is does not mimic the interaction between the abrasive powder and the balls during milling, but only the interaction between the balls themselves. This fact makes the values obtained unreliable. Directly measuring the mass of the powder after milling is not a solution either as this deposit represents such a small mass increment to the powder mass and is impractical to measure.

Embodiments of this disclosure can allow for the use of a tracer (e.g., non-radioactive) to help quantify the wear of a grinding medium during mechanical milling of ceramic powders. Embodiments can utilize the doping of a commercially available grinding medium, e.g., by high temperature diffusion, with species (e.g. Cr3+, Eu3+, Fe3+, . . . ) that can easily be quantified by modern analytical techniques. The milling medium, doped with the tracer, can then be run on a sacrificial powder mixture and the concentration of the tracer released in the powder mixture after milling is then measured (via optical or mass-spectroscopy for example). The total amount of tracer in the grinding medium after doping can be measured (in the form of a diffusion profile) via a surface sensitive chemical analysis technique and can allow one to calculate the wear that each ball experienced. Kinetics studies, whereby small aliquots of powder mixtures are sampled at varied milling times can help optimize the milling process and favor good comminution while keeping abrasion and contamination low. The dopant/tracer material can be chosen so as to form a solid solution with the milling medium and to not significantly alter its mechanical properties (hardness and wear resistance).

Compared to currently available technology, embodiments can provide a method to accurately assess the quantity of extraneous phase impurity introduced to a powder mixture during milling. Embodiments allow for timely, direct, inexpensive, and precise measurement of the impurity content introduced to powder mixture during the milling process that could be deleterious to the materials properties and performance.

There is no previously known method to accurately and quantitatively determine the amount of trace impurities that are introduced to a powder mixture during the ball/attrition milling process. Up until now, people have used time consuming trial and error methods that lead to a high degree of uncertainty in this determination. Embodiments provide a method to accurately determine the amount of impurity introduced, thus reducing the time necessary to optimize this process while also providing a means to increase the quality of the products. Milling (such as ball milling or attrition milling) is used to deagglomerate and mix powders for the fabrication of advanced glasses and ceramics. Embodiments can provide the ability to accurately quantify the amount of impurity introduced during the milling process to allow for compensation for the impurities.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A method, comprising:
- milling a powder with a test grinding media;
- determining an amount of abraded grinding media that abrades from the test grinding media into the powder due to the milling of the powder; and
- creating a compensated powder to account for the amount of the abraded grinding media such that the powder milling process results in a powder composition.

2. The method of claim 1, further comprising milling the compensated powder with a similar grinding media to the test grinding media to result in the powder composition including the abraded grinding media.

3. The method of claim 2, wherein determining the amount of the abraded grinding media includes:
- detecting an amount of a detectable tracer material integrated within a bulk material of the test grinding media; and
- correlating the amount tracer material to the amount of the abraded grinding media.

4. The method of claim 3, wherein correlating the amount of the abraded grinding media includes correlating the amount of tracer material to a thickness of the test grinding media.

5. The method of claim 4, wherein correlating the amount of tracer material to a thickness includes using a diffusion profile.

6. The method of claim 2, further comprising creating the test grinding media to include the detectable tracer material.

7. The method of claim 6, wherein creating the test grinding media includes diffusing the detectable tracer material into a bulk material of the test grinding media.

8. The method of claim 7, wherein a bulk material of the similar grinding media is made only of one or more constituent materials of the desired powder composition.

9. The method of claim 8, wherein the bulk material of the similar grinding media is the same as the bulk material of the test grinding media.

10. The method of claim 9, wherein the similar grinding media does not include a tracer material.

11. The method of claim 10, wherein the test grinding media and/or the similar grinding media includes one or more grinding balls.

12. A method, comprising:
- forming one or more test grinding media to include:
  - a bulk material; and
  - a detectable tracer material integrated with the bulk material and configured to allow for correlation between an amount of a tracer material that is in a milled powder to an abraded amount of grinding media from the grinding media.

13. The method of claim 12, further comprising diffusing the tracer material into a bulk material to form a diffusion profile that is a function of depth.

14. The method of claim 13, further comprising providing diffusion profile information to a user to correlate the amount of the tracer material to the amount of abraded grinding media.

15. The method of claim 12, further comprising forming the grinding media to have a constant amount of tracer material integrated within the bulk material.

16. A test grinding media, comprising:
- a bulk material; and
- a detectable tracer material integrated with the bulk material and configured to allow for correlation between an amount of a tracer material that is in a milled powder to an abraded amount of grinding media from the grinding media.

17. The media of claim 16, wherein the test grinding media is formed as one or more balls.

18. The media of claim 16, wherein the tracer material is not radioactive, and wherein the bulk material is alumina.

* * * * *